(12) United States Patent
Ambikapathy et al.

(10) Patent No.: US 8,108,582 B2
(45) Date of Patent: Jan. 31, 2012

(54) NOTIFYING ASYNCHRONOUS EVENTS TO A HOST OF A DATA STORAGE SYSTEM AND APPARATUS FOR THE SAME

(75) Inventors: Baskaran Ambikapathy, Karnataka (IN); Prashanth Eswari Prasad Kagganti, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 12/249,977

(22) Filed: Oct. 13, 2008

(65) Prior Publication Data

US 2010/0057966 A1    Mar. 4, 2010

(30) Foreign Application Priority Data

Aug. 27, 2008  (IN) ............................ 2086/CHE/2008

(51) Int. Cl.
*G06F 13/24* (2006.01)
*G06F 13/32* (2006.01)

(52) U.S. Cl. ........................................ 710/260; 710/267

(58) Field of Classification Search .................. 710/260, 710/267
See application file for complete search history.

(56) References Cited

U.S. PATENT DOCUMENTS

| | | | | |
|---|---|---|---|---|
| 5,692,197 A | * | 11/1997 | Narad et al. | 713/323 |
| 5,951,648 A | * | 9/1999 | Kailash | 709/237 |
| 6,185,639 B1 | * | 2/2001 | Kailash et al. | 710/48 |
| 6,708,241 B1 | * | 3/2004 | Futral | 710/260 |
| 6,710,963 B2 | * | 3/2004 | Iida | 360/69 |
| 7,246,187 B1 | * | 7/2007 | Ezra et al. | 710/200 |

* cited by examiner

*Primary Examiner* — Mark Rinehart
*Assistant Examiner* — Jeremy S Cerullo

(57) ABSTRACT

A method of notifying asynchronous events to a host of a data storage system is presented. The method comprises the steps of: detecting an asynchronous event; generating an interrupt message in response to the detected asynchronous event; and communicating the generated interrupt message to the host.

12 Claims, 3 Drawing Sheets

NOTIFYING ASYNCHRONOUS EVENTS TO A HOST OF A DATA STORAGE SYSTEM AND APPARATUS FOR THE SAME

RELATED APPLICATIONS

Benefit is claimed under 35 U.S.C. 119(a)-(d) to Foreign application Ser No. 2086/CHE/2008 entitled "NOTIFYING ASYNCHRONOUS EVENTS TO A HOST OF A DATA STORAGE SYSTEM AND APPARATUS FOR THE SAME" by Hewlett-Packard Development Company, L.P., filed on 27 Aug. 2008, which is herein incorporated in its entirety by reference for all purposes.

FIELD OF THE INVENTION

This invention relates to data storage systems; and more particularly to notifying asynchronous events to a host of a data storage system.

BACKGROUND

Known data storage systems use Redundant Arrays of Inexpensive Disks (RAID) and associated RAID controllers. RAID functionality includes creating a logical unit out of physical drives according to different RAID levels; deleting the logical unit; expanding the RAID; extending the RAID; migrating the RAID Level; recovering the logical unit; rebuilding the logical unit; and managing the physical drives. Commonly used RAID levels include RAID 0 (Striping); RAID 1 (Mirroring); RAID 5 (Distributed parity); and ADG (Advanced Data guarding). The supported RAID levels vary with respect to the type of RAID controller and manufacturer.

Basic SCSI (Small Computer System Interconnect) controllers do not provide any of the above mentioned RAID functionalities. The SCSI controller manages the write/read of data to the physical drives with proper synchronization. Thus a RAID Controller provides the RAID functionality described above in addition to coordinating communication between the SCSI devices on the SCSI bus and the computer.

It is known to notify a RAID controller of asynchronous events, such as disk drive hardware error, that occur in the controlled RAID system. Such a RAID controller can then notify a host driver of the RAID system for subsequent appropriate action to be taken.

Conventional computer systems using RAID-based data storage systems are arranged to poll the storage system in order to communicate detected events to software components of the computer system. In response to the polling call, the RAID controller provides event data in a thread (otherwise referred to as an Asynchronous Event Queue) for processing.

Conventional RAID controllers do not allow for communication of asynchronous events without being polled.

Polling by a mini-port driver in order to keep event information detected by a RAID controller current creates network traffic and system overhead. Polling also allows for event information to become stale for certain periods as event information detected is not updated until the next polling call. Since a computer system may support a number of RAID controllers, it may be necessary to poll each controller to update detected asynchronous event information.

It is known to increase the polling frequency in an effort to maintain more current asynchronous event information. However, such an approach undesirably increases data traffic and overhead.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Redundant Array of Inexpensive Disks (RAID) is a technology which combines two or more hard-disk drives to achieve greater performance, reliability and capacity. In particular, when the array is suitably configured, data is stored on the disks with redundancy (and diversity) that allows at least one disk to be removed from the array without corrupting the information stored in the remaining disks. This means, for example, that a disk drive can be removed and replaced with a blank drive; the information stored on the missing disk can then be reconstructed from the persisting contents of the remaining disks and written to the blank one. Operations of this kind can be carried out autonomously by the array controller, without intervention, or even the awareness of the host system. An array controller manages all the necessary operations.

In one scenario, a RAID controller using parallel SCSI can be connected to a storage enclosure that has a built-in enclosure processor. This processor, or Environmental Monitoring Unit (EMU), monitors fans, controls LEDs, etc. The EMU also provides information about hot-plug events in the enclosure. The array controller is thus always aware of the insertion or removal of a SCSI disk drive in the storage enclosure.

Such RAID controllers enable logical units to be configured with desired fault tolerance levels (RAID levels) on the physical drives connected to the storage enclosure. If a physical drive configured as part of the RAID array fails due, for example, to hardware issues such as a fatal disk error, then the EMU on the storage enclosure notifies the drive failure to the array controller by sending an Asynchronous Event message.

Typically, in the event of a hardware failure, some external corrective action is required. For example, a system administrator should be alerted to the failure and replace the defective disk drive in question. This means that is necessary to communicate an event notification to the host (for example a host computer).

Since a given RAID array has a predetermined degree of redundancy (dependent on its particular configuration), if additional disks fail before the first (failed) disk has been replaced and had its data reconstituted, irrecoverable data loss may result.

Figure 1:
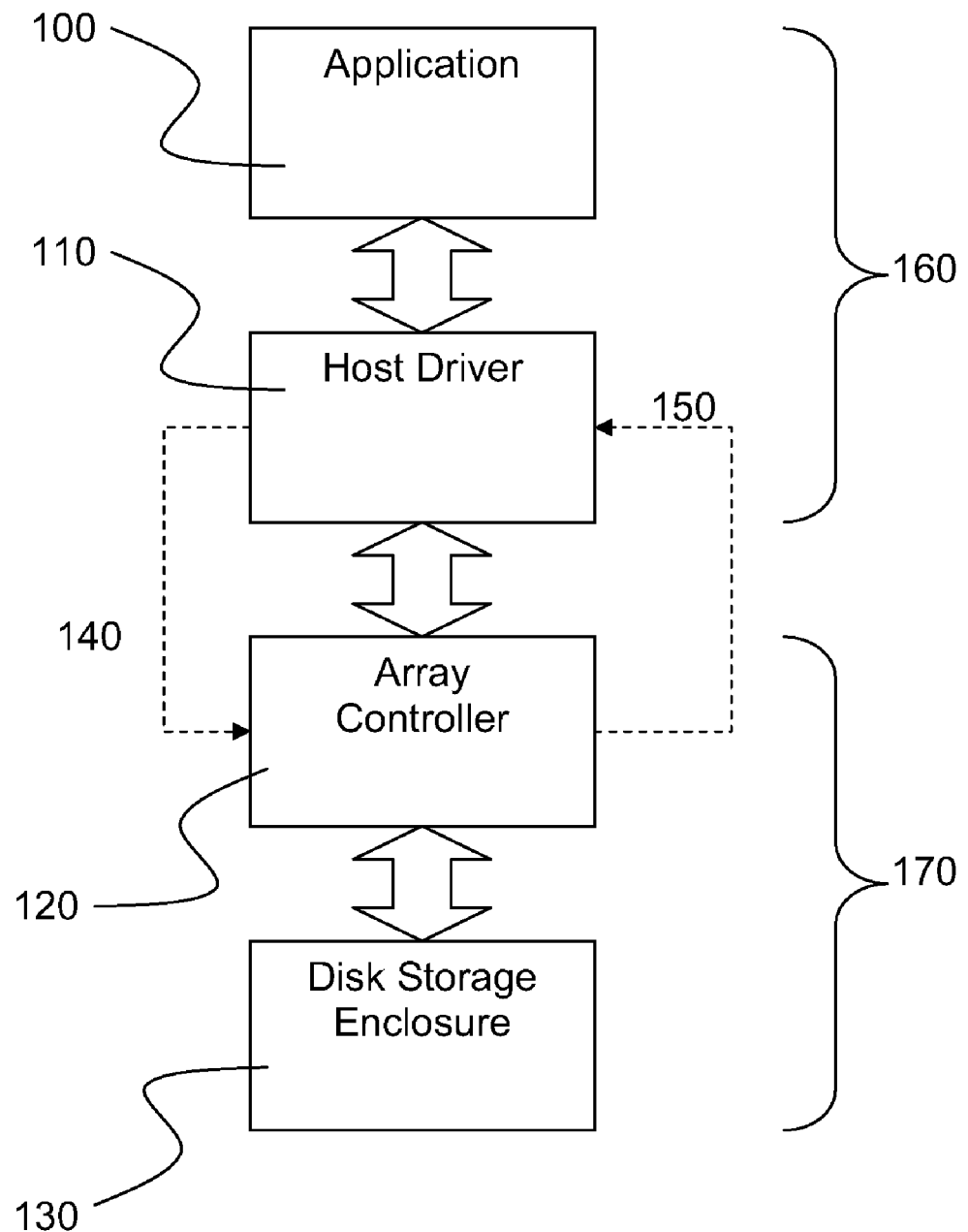
FIG. 1 illustrates an interaction of a data storage system and a host according to a prior art method.

FIG. 1 illustrates how an array controller 120 in a data storage system 170 interacts with a host driver 110 running in a host 160. Upon receiving an Asynchronous Event message from the disk storage enclosure 130, the array controller 120 maintains it in its Asynchronous Event queues. The host driver 110 must register or poll for these queued Asynchronous Event messages so as to be notified of the hardware failure, as indicated by the arrow 140. In one scenario, the host driver must register and then wait for an event (if any) to be notified. Upon the notification of such an Asynchronous Event, as indicated by the arrow 150, the host driver 110 should process this event and after processing should register once again with the array controller in order to be notified of the (potential) next event. If the host driver 110 fails to register for these Asynchronous Events notifications, the events go unnoticed and there is no way that the application 100 can be informed of the disk failure. This can result in unexpected or undesirable consequences—for example the corresponding logical unit may enter a non-operational state such that an application trying to perform input/output (I/O) operations on the logical unit fails with a "medium offline" error. The application will not be aware of why the I/O has failed.

Figure 2:
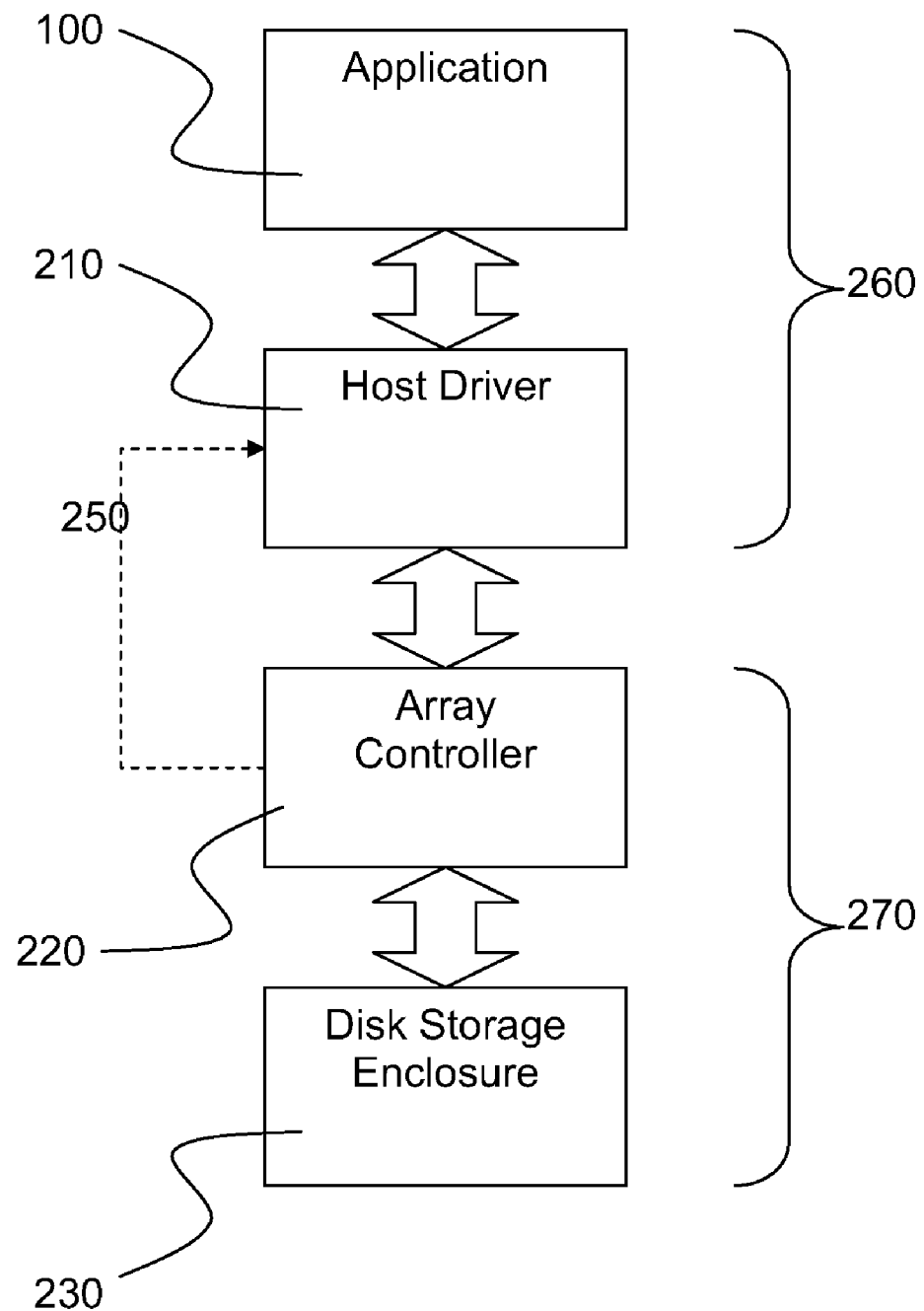
FIG. 2 illustrates an interaction of a data storage system and a host according to an embodiment.

A method according to an embodiment of the invention addresses the limitations of the known approach. Such a method will now be described with reference to FIGS. 2 and 3.

Disk storage enclosure 230 detects the failure of a disk or other hardware event and notifies the array controller 220. This communication from the storage enclosure 230 to the controller 220 occurs in a conventional manner over the SCSI bus.

Examples in existing SCSI technologies of the SCSI control lines used for communication between the RAID controller 220 and the devices connected to it include: BSY, SEL, C/D, I/O, MSG, REQ, REQQ, ACK, ACKQ, ATN, RST, DB (7-0), DB (P), DB (15-0), DB (P), and DB (P1)). These control lines are specific to SCSI protocol used for the communication between the RAID controller 220 and the devices connected to it. According to the embodiment, there is no change in the use of these control lines.

The proposed concept is that the RAID controller 220 will raise an interrupt in certain situations—such as on receipt of a predetermined hardware event from the devices connected to it or from the storage enclosure 230. When such a situation occurs, the array controller 220 raises an interrupt with the host driver 210 as indicated by the arrow 250. If necessary, the controller 220 may check the type of event detected before raising the interrupt.

The host driver 210 handles the interrupt. The handling done by the driver may involve activities such as notifying the application 100 of the hardware event/failure so that appropriate remedial measures are taken (for example, triggering a rebuild operation or alerting an administrator to manually replace a failed disk). This mode of operation—generating and handling an interrupt—is an asynchronous way of handling the failure and results in almost real time processing of errors.

A hardware interrupt, of the type raised by the array controller 220 in this embodiment, is an asynchronous signal from a piece of hardware, indicating the need for attention. Receipt of an Interrupt Request (IRQ) causes a processor to save its state of execution and begin execution of an interrupt handler. The interrupt handler, or Interrupt Service Routine (ISR), is a sub-routine which services the request by carrying out measures appropriate to the type of interrupt. The kind of interrupt can be determined, for example, by arranging for the interrupt to set one or more bits in a register upon delivery and consulting this register to determine the type of interrupt.

An interrupt may be delivered via a dedicated control line, such as an interrupt request line. Such interrupts may be edge-triggered, level triggered or a hybrid of both signaling methods. Alternatively, interrupts may be message-signaled, in which case there is no dedicated physical control line. Instead, the request for service is signaled over some other communications medium, such as a bus architecture.

The type of interrupt and the physical connections by which it is communicated will vary between systems. For example, the array controller 220 may communicate with the host over a PCI (Peripheral Component Interconnect) bus which connects the controller to the host machine.

In many conventional systems, registers are used for synchronous communication, when the host wants to communicate to the controller firmware and the controller firmware responds. The registers are used to synchronize the communication between the host driver and the controller firmware. For example, if the host driver wants to communicate a read command to the controller firmware, then it sets a particular bit in a register that generates (outbound) an interrupt to the controller firmware. Similarly, if the controller firmware wants to communicate the response of the command to the host driver, it sets a particular bit in a register that interrupts (inbound) the host driver.

In one embodiment, these existing registers may be re-used. Thus, the interrupt raised by the array controller 220 with the host driver 210 is the same interrupt signal that is used to notify the host driver of completion of a read/write operation. The exact details of this interrupt will vary between array controllers provided by different manufacturers. However, such an interrupt typically uses an interrupt status register and an interrupt enable register to communicate the asynchronous message information to the host driver. In this case, a predetermined bit in the interrupt status register will be set with the status of the interrupt and a predetermined bit in the interrupt enable register will contain the type of interrupt that is enabled. The interrupt status register will also be updated with the reason for the hardware event occurrence.

The predetermined bits, like the registers and type of interrupt will vary between controller manufacturers. Likewise, the size of the registers is specific to the controller—for example: 16-bit, 32-bit or 64-bit registers. In any case, the key requirement is interoperability between the host driver and the array controller. This is usually assured by both driver and controller being provided by the same manufacturer. In order to handle the interrupt, the interrupt handler (ISR) of the host driver 210 examines (reads) the interrupt enable register. If the relevant predetermined bit or bits are set it understands this to mean that a hardware event has occurred and reads the interrupt status register. Based on the content of the status register the host driver 210 takes appropriate corrective action, such as notifying the application or administrator of the event or taking proactive measures such as initiating rebuild and recovery operations.

Figure 3:
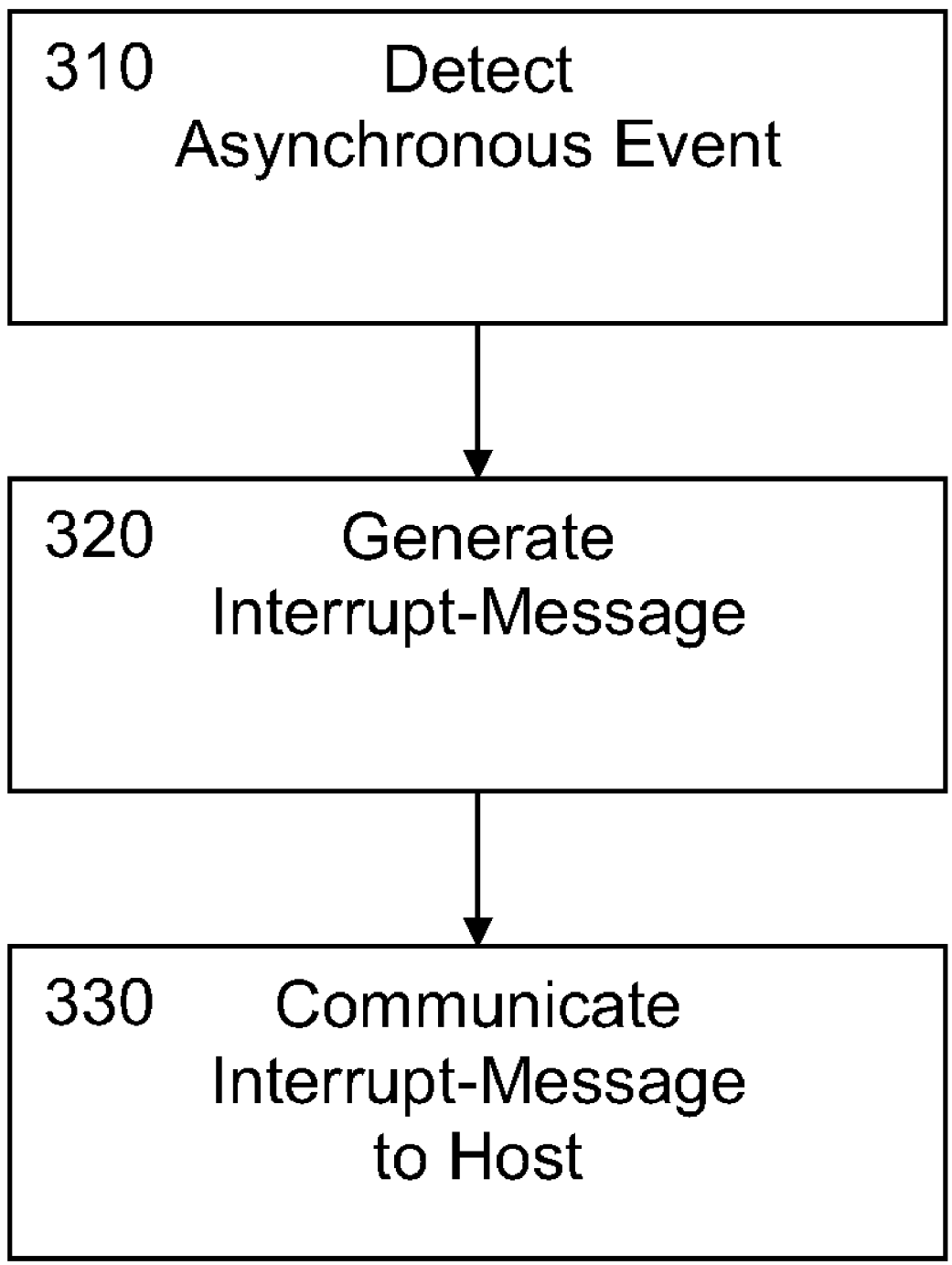
FIG. 3 shows steps in a method of notifying asynchronous events according to an embodiment.

FIG. 3 illustrates the flow chart of a method according to an embodiment.

At step 310 an Asynchronous Event is detected. This may involve the enclosure 230 detecting (for example) the failure of the disk or other hardware event and notifying the array controller 220 by sending a message. The communication happens using the SCSI Bus in the conventional way.

At step 320, the RAID controller 220, having received the hardware event message, raises an interrupt to the host driver 210—that is, the RAID controller firmware sets a particular bit in a register that interrupts (inbound) the host driver 210. This interrupt signal used may be the same interrupt signal ordinarily used to notify the host driver of completion of a read/write operation. These registers are the interrupt status register and interrupt enable register. The interrupt status registers contains the status of the interrupt and interrupt enable register contains the type of interrupt that is enabled. As mentioned above, these registers and type of interrupts vary with controller manufacturer. The RAID controller 220 also updates a status register about the reason for the hardware event occurrence. The name of the register may vary with respect to the controller manufacturer.

At step 330, the host driver 210 examines the interrupt register and if the specific bit is set in the register (as set by the controller firmware), it treats that as a hardware event and reads the status register. Based on the content of the status register, the host driver 210 can take appropriate corrective action, such as notifying the application 100 or an administrator of the hardware event/failure or taking immediate proactive measures such as triggering rebuild or recovery operations etc.

The above steps can be applied equally to controllers utilizing either parallel or serial implementations of SCSI. However, in serial systems, such as SAS (Serial Attached SCSI) or equivalently SATA (Serial Advanced Technology Attachment), the registers that will be appropriate may be different.

The proposed concept is related to communication, by means of an interrupt, between the array controller 220 and the host driver 210. Fundamentally, this does not depend on the type of SCSI implementation, unlike existing mechanisms for asynchronous event notification which vary with respect to the type of SCSI (SCSI/RAID or SAS).

In order to implement an embodiment, only minor changes are needed to conventional hardware elements. A standard array controller may be modified to raise an interrupt upon receipt of an Asynchronous Event notification message from the storage enclosure. This could be achieved, for example, by modifying the firmware of the array controller. The host driver may be modified to handle interrupts raised by such a modified array controller, for example by modifying its interrupt service routine. There is no necessity to modify the disk, disk storage enclosure or any applications.

The Asynchronous Event notification and handling described is achieved without polling or registration for messages by the host driver; nor does it require the host driver to enable event notification for the port. This is because the array controller is configured to produce a hardware interrupt immediately upon receipt of an Asynchronous Event message. Thus, the method avoids the need for a registration mechanism (typically an additional thread of the host driver) to register for every hardware event that occurs. This can improve the performance of the host driver. Furthermore, the raising of the interrupt provides an opportunity to handle any error or failure almost in real-time (that is, effectively immediately), thereby reducing potential downtime or loss of service. As well as offering instantaneous notification, the use of an interrupt is significant in that it can avoid the need for any further communication from the host to the array controller, for example to determine the nature of the problem or service required. It is also not necessary for the host driver to acknowledge the occurrence of the asynchronous event on receipt of the interrupt—interrupts are a reliable signaling mechanism and are by definition handled immediately upon receipt. This reduces overhead on the host driver. Thus, the host driver does not need to send an event acknowledgement (e.g. EVENT ACK) command to the controller to acknowledge each individual event that has occurred. This reduces the overhead on the host driver.

The host driver, based on the hardware event type, according to the interrupt, can automate the diagnosis of problems and implementation of appropriate solutions (for example, logical unit recovery or rebuild operation, if required). This can enable I/O operations to continue without any disruptions. This ability to take timely action in response to any disk or RAID failure can ensure that applications will be minimally impacted (if at all) by such failures. As a further advantage, the approach is platform independent, in that it can be implemented across operating systems.

Note that the host driver can choose whether or not to take action in response to the notification. If it is not interested in processing a given interrupt, the driver can mask the interrupt and ignore it.

Another possibility, which allows backward compatibility with legacy host drivers, is to design the array controller to support both the traditional registration/polling mode of operation and the interrupt-based notification of the embodiment. In other words, upon detection of an Asynchronous Event, the array controller raises an interrupt but also maintains the message in an Asynchronous Event queue in the usual way. In this way, host drivers that are not adapted to receive and process interrupts raised by an array controller can still function correctly with an array controller according to an embodiment, by registering or polling for messages stored in the queue.

Methods according to an embodiment of the invention are relevant for RAID/Array controllers. However, they can equally be applied to any other SCSI controller.

While specific embodiments have been described herein for purposes of illustration, various other modifications will be apparent to a person skilled in the art and may be made without departing from the scope of the invention.

The invention claimed is:

1. A method of notifying asynchronous events of a data storage system to a host, wherein the data storage system comprises a RAID controller for controlling an array of data storage devices, comprising:
   detecting an asynchronous event by a disk storage enclosure of the data storage system; generating an interrupt message in response to the detected asynchronous event by the RAID controller; and
   communicating the generated interrupt message to the host immediately upon receipt of the detected asynchronous event by the RAID controller without the host being polled or registered for the generated interrupt message.

2. The method of claim 1, wherein the step of communicating is completed independently of an asynchronous event notification thread.

3. The method of claim 1 or 2, further comprising processing the interrupt message, and wherein the step of processing is undertaken by the host.

4. A non-transitory computer readable storage medium storing a computer program having code that, when executed by a computer, cause the computer to perform a method as claimed in claim 1.

5. The method of claim 1, wherein the asynchronous event comprises failure of at least one data storage device or at least one other hardware event.

6. The method of claim 1, wherein generating the interrupt message comprises:
   setting a particular bit in a register that interrupts the host by the RAID controller, wherein the generated interrupt message used to interrupt the host is same as an interrupt signal used to notify the host of completion of a read/write operation.

7. The method of claim 6, wherein setting the particular bit in the register comprises:
   setting a predetermined bit in an interrupt status register with a status of the generated interrupt message; and
   setting a predetermined bit in an interrupt enable register containing a type of the generated interrupt message that is enabled.

8. The method of claim 1, wherein communicating the generated interrupt message to the host by the RAID controller comprises:
   communicating the generated interrupt message to the host via a peripheral component interconnect by the RAID controller.

9. The method of claim 1, further comprising:
updating a status register associated with the RAID controller with a reason for the asynchronous event occurrence.

10. A computer system comprising:
a host; and
a data storage system, wherein the data storage system comprises a RAID controller for controlling an array of data storage devices, comprising:
- a disk storage enclosure for detecting an asynchronous event; and
- the RAID controller adapted to generate an interrupt message in response to the detected asynchronous event and to communicate the generated interrupt message to the host immediately upon receipt of the detected asynchronous event without the host being polled or registered for the generated interrupt message.

11. A computer system according to claim 10, wherein the RAID controller is adapted to communicate the generated interrupt message to the host independently of an asynchronous event notification thread.

12. A data storage system for controlling an array of data storage devices, comprising:
- a disk storage enclosure for detecting an asynchronous event;
- a RAID controller adapted to generate an interrupt message in response to the detected asynchronous event and to communicate the generated interrupt message to a host immediately upon receipt of the detected asynchronous event for handling the generated interrupt message without the host being polled or registered for the generated interrupt message.

* * * * *